US011980810B2

(12) United States Patent
Yamano et al.

(10) Patent No.: US 11,980,810 B2
(45) Date of Patent: *May 14, 2024

(54) INFORMATION PROCESSING SYSTEM, OPERATION DEVICE, AND OPERATION DEVICE CONTROL METHOD

(71) Applicant: Sony Interactive Entertainment Inc., Tokyo (JP)

(72) Inventors: Ikuo Yamano, Tokyo (JP); Yusuke Nakagawa, Kanagawa (JP); Shinichi Hirata, Kanagawa (JP); Yuichi Machida, Kanagawa (JP); Yoichi Nishimaki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,863

(22) Filed: Apr. 21, 2022

(65) Prior Publication Data

US 2022/0241684 A1    Aug. 4, 2022

Related U.S. Application Data

(63) Continuation of application No. 16/311,778, filed as application No. PCT/JP2017/017909 on May 11, 2017, now Pat. No. 11,344,797.

(30) Foreign Application Priority Data

Jul. 26, 2016 (JP) ................................. 2016-146604

(51) Int. Cl.
*G06F 3/01* (2006.01)
*A63F 13/20* (2014.01)
(Continued)

(52) U.S. Cl.
CPC ............ *A63F 13/285* (2014.09); *A63F 13/23* (2014.09); *A63F 13/24* (2014.09); *G06F 3/01* (2013.01); *G06F 3/016* (2013.01)

(58) Field of Classification Search
CPC .................... A63F 13/28; A63F 13/285; A63F 2300/1037; A63F 2300/302; G06F 3/01;
(Continued)

(56) References Cited

U.S. PATENT DOCUMENTS 5,555,894 A    9/1996  Doyama
5,734,373 A    3/1998  Rosenberg
(Continued)

FOREIGN PATENT DOCUMENTS

CN    101610877 A    12/2009
CN    104043246 A    9/2014
(Continued)

OTHER PUBLICATIONS

International Search Report for related PCT Application No. PCT/JP2017/004763, 2 pages, dated Apr. 18, 2017.
(Continued)

*Primary Examiner* — Lawrence S Galka
(74) *Attorney, Agent, or Firm* — Matthew B. Dernier, Esq.

(57) ABSTRACT

An operation device has a movable portion movable between a first position and a second position. The movable portion is operated by a user while the operation device is gripped by the user. The operation device receives information identifying a control mode and control information defined for each control mode as an instruction related to control of a tactile force sense, and controls the tactile force sense presented to the movable portion by using the received control information in the control mode identified by the received information.

7 Claims, 7 Drawing Sheets

(51) Int. Cl.
    *A63F 13/23* (2014.01)
    *A63F 13/24* (2014.01)
    *A63F 13/285* (2014.01)
(58) Field of Classification Search
    CPC ...... G06F 3/016; G06F 3/0338; G06F 3/0383;
        G06F 2203/013; G06F 2203/014; G06F
        2203/015; G05G 5/03; G05G
        2009/04766; H01H 13/85; H01H
        2003/008
    See application file for complete search history.

(56) References Cited

U.S. PATENT DOCUMENTS

| | | | |
|---|---|---|---|
| 5,982,354 A | 11/1999 | Arita | |
| 5,999,168 A * | 12/1999 | Rosenberg | G06F 3/016 |
| | | | 345/161 |
| 6,380,925 B1 | 4/2002 | Martin | |
| 6,468,158 B1 | 10/2002 | Yasuhiro | |
| 7,196,688 B2 | 3/2007 | Schena | |
| 7,407,439 B1 | 8/2008 | Ochoa | |
| 7,890,863 B2 | 2/2011 | Grant | |
| 8,059,089 B2 | 11/2011 | Daniel | |
| 8,491,388 B2 | 7/2013 | Miyazaki | |
| 8,686,961 B2 | 4/2014 | Yamano | |
| 9,164,587 B2 | 10/2015 | Da Costa | |
| 9,174,134 B1 | 11/2015 | Grant | |
| 9,174,344 B2 | 11/2015 | Nahavandi | |
| 9,490,088 B2 | 11/2016 | Akira | |
| 9,557,830 B2 | 1/2017 | Grant | |
| 9,606,569 B2 | 3/2017 | Zentaro | |
| 9,778,743 B2 | 10/2017 | Grant | |
| 9,785,237 B2 | 10/2017 | Shinozaki | |
| 9,921,649 B2 | 3/2018 | Grant | |
| 10,124,252 B2 | 11/2018 | Grant | |
| 10,133,354 B2 | 11/2018 | Grant | |
| 10,159,896 B2 | 12/2018 | Strahle | |
| 10,185,396 B2 | 1/2019 | Rihn | |
| 10,216,278 B2 | 2/2019 | Nakamura | |
| 10,226,693 B2 | 3/2019 | Strahle | |
| 10,300,778 B2 | 5/2019 | Nomizo | |
| 10,353,471 B2 | 7/2019 | Da Costa | |
| 10,509,472 B2 | 12/2019 | Grant | |
| 10,534,432 B2 | 1/2020 | Okumura | |
| 10,632,367 B2 | 4/2020 | Strahle | |
| 2001/0002126 A1 | 5/2001 | Rosenberg | |
| 2001/0008849 A1 | 7/2001 | Komata | |
| 2001/0011995 A1 | 8/2001 | Hinckley | |
| 2001/0030658 A1 | 10/2001 | Rosenberg | |
| 2002/0054060 A1 | 5/2002 | Schena | |
| 2002/0075233 A1 | 6/2002 | White | |
| 2002/0190528 A1 | 12/2002 | Ootori | |
| 2004/0113932 A1 | 6/2004 | Rosenberg | |
| 2005/0134562 A1 * | 6/2005 | Grant | G08B 6/00 |
| | | | 345/161 |
| 2005/0156892 A1 | 7/2005 | Grant | |
| 2006/0028095 A1 | 2/2006 | Maruyama | |
| 2008/0316171 A1 * | 12/2008 | Shahoian | G06F 3/03543 |
| | | | 345/158 |
| 2009/0106655 A1 | 4/2009 | Grant | |
| 2009/0131171 A1 | 5/2009 | Miyazaki | |
| 2010/0092267 A1 | 4/2010 | Najdovski | |
| 2011/0134034 A1 | 6/2011 | Daniel | |
| 2012/0026110 A1 | 2/2012 | Yamano | |
| 2012/0038468 A1 | 2/2012 | Provancher | |
| 2012/0105367 A1 | 5/2012 | Son | |
| 2012/0154134 A1 | 6/2012 | Lim | |
| 2013/0147610 A1 | 6/2013 | Grant | |
| 2013/0265149 A1 | 10/2013 | Nakamura | |
| 2013/0267321 A1 | 10/2013 | Burgess | |
| 2013/0321273 A1 | 12/2013 | O'Keeffe | |
| 2014/0094310 A1 | 4/2014 | Bleich | |
| 2014/0139451 A1 | 5/2014 | Levesque | |
| 2014/0274398 A1 * | 9/2014 | Grant | G06F 3/016 |
| | | | 463/37 |
| 2014/0305783 A1 | 10/2014 | Sawada | |
| 2014/0315642 A1 * | 10/2014 | Grant | A63F 13/285 |
| | | | 345/184 |
| 2015/0002416 A1 | 1/2015 | Koike | |
| 2015/0035658 A1 | 2/2015 | Provancher | |
| 2015/0042461 A1 | 2/2015 | Shinozaki | |
| 2015/0097800 A1 | 4/2015 | Grant | |
| 2015/0098004 A1 | 4/2015 | Zentaro | |
| 2015/0130707 A1 | 5/2015 | Da Costa | |
| 2015/0133221 A1 | 5/2015 | Grant | |
| 2015/0248160 A2 | 9/2015 | Provancher | |
| 2016/0051986 A1 | 2/2016 | Lin | |
| 2016/0132114 A1 | 5/2016 | Rihn | |
| 2016/0132116 A1 | 5/2016 | Grant | |
| 2016/0259536 A1 | 9/2016 | Kudurshian | |
| 2016/0313795 A1 | 10/2016 | Muramatsu | |
| 2016/0361639 A1 | 12/2016 | Schmitz | |
| 2017/0031442 A1 | 2/2017 | Dabic | |
| 2017/0136351 A1 | 5/2017 | Long | |
| 2017/0177102 A1 | 6/2017 | Long | |
| 2017/0203208 A1 | 7/2017 | Sato | |
| 2017/0235364 A1 | 8/2017 | Nakamura | |
| 2017/0351394 A1 | 12/2017 | Sumida | |
| 2018/0018020 A1 | 1/2018 | Grant | |
| 2018/0250587 A1 | 9/2018 | Strahle | |
| 2018/0284893 A1 | 10/2018 | Shimizu | |
| 2018/0333642 A1 | 11/2018 | Strahle | |
| 2019/0025916 A1 | 1/2019 | Okumura | |
| 2019/0038968 A1 | 2/2019 | Machida | |
| 2019/0073038 A1 | 3/2019 | Provancher | |
| 2019/0118081 A1 | 4/2019 | Strahle | |
| 2019/0224565 A1 | 7/2019 | Yamano | |

FOREIGN PATENT DOCUMENTS

| | | |
|---|---|---|
| CN | 104107539 | 10/2014 |
| CN | 104798013 A | 7/2015 |
| EP | 0626634 A2 | 11/1994 |
| EP | 0852789 A1 | 7/1998 |
| EP | 1524578 A1 | 4/2005 |
| EP | 2778852 A2 | 9/2014 |
| EP | 2796965 A2 | 10/2014 |
| EP | 2873446 A1 | 5/2015 |
| JP | 7194846 A | 8/1995 |
| JP | 07220563 A | 8/1995 |
| JP | 11514469 A | 12/1999 |
| JP | 2000195370 A | 7/2000 |
| JP | 2003519861 A | 6/2003 |
| JP | 2003330585 A | 11/2003 |
| JP | 2005190465 A | 7/2005 |
| JP | 3686686 B2 | 8/2005 |
| JP | 2006157642 A | 6/2006 |
| JP | 2007330369 A | 12/2007 |
| JP | 2008173186 A | 7/2008 |
| JP | 2008257295 A | 10/2008 |
| JP | 2008257748 A | 10/2008 |
| JP | 2009119125 A | 6/2009 |
| JP | 2010020526 A | 1/2010 |
| JP | 2010146507 A | 7/2010 |
| JP | 2012027875 A | 2/2012 |
| JP | 2012118761 A | 6/2012 |
| JP | 2012128499 A | 7/2012 |
| JP | 2013045230 A | 3/2013 |
| JP | 2013117900 A | 6/2013 |
| JP | 2014174660 A | 9/2014 |
| JP | 2014180572 A | 9/2014 |
| JP | 2014216017 A | 11/2014 |
| JP | 2015011470 A | 1/2015 |
| JP | 2015075912 A | 4/2015 |
| JP | 2015076097 A | 4/2015 |
| JP | 2015111417 A | 6/2015 |
| JP | 2015111542 A | 6/2015 |
| JP | 2015158912 A | 9/2015 |
| JP | 2016001510 A | 1/2016 |
| JP | 2016067667 A | 5/2016 |
| JP | 2016095625 A | 5/2016 |
| JP | 2017508191 A | 3/2017 |
| KR | 20050048902 A | 5/2005 |
| KR | 1020150056070 A | 5/2015 |

(56) References Cited

FOREIGN PATENT DOCUMENTS

| WO | 9712357 | A1 | 4/1997 |
|---|---|---|---|
| WO | 2005116802 | A1 | 12/2005 |
| WO | 2013099742 | A1 | 7/2013 |
| WO | 2015092966 | A1 | 6/2015 |
| WO | 2016051986 | A1 | 4/2016 |
| WO | 2016105496 | A1 | 6/2016 |
| WO | 2016114269 | A1 | 7/2016 |
| WO | 2017150128 | A1 | 9/2017 |
| WO | 2017150129 | A1 | 9/2017 |

OTHER PUBLICATIONS

International Preliminary Report on Patentability and Written Opinion for related PCT Application No. PCT/JP2017/004763, 11 pages, dated Sep. 13, 2018.
International Search Report for related PCT Application No. PCT/JP2017/017909, 7 pages, dated Jul. 18, 2017.
International Search Report for related PCT Application No. PCT/2017/004978, 4 pages, dated Mar. 14, 2017.
International Search Report for related PCT Application No. PCT/JP2017/018914, 2 pages, dated Aug. 22, 2017.
International Preliminary Report on Patentability and Written Opinion for related PCT Application No. PCT/JP2017/017909, 17 pages, dated Feb. 7, 2019.
International Preliminary Report on Patentability and Written Opinion for related PCT Application No. PCT/JP2017/018914, 13 pages, dated Feb. 7, 2019.
International Preliminary Report on Patentability and Written Opinion for related PCT Application No. PCT/PCT/2017/004978, 13 pages, dated Jan. 31, 2019.
Notification of Reasons for Refusal for related JP Application No. 2018-528391, 9 pages, dated Apr. 23, 2019.
Extended European Search Report for related EP Application No. 17833789.5, 10 pages, dated May 23, 2019.
Supplementary Search Report for relatedng European Search Report for corresponding Application No. 17833805, 12 pages, dated Jul. 19, 2019.
Decision of Refusal for related Japanese Patent Application No. 2018-528391, 10 pages, dated Jul. 9, 2019.
Extended European Search Report for related European Application No. 17759599.8, 7 pages, dated Sep. 9, 2019.
Korean Office Action for related Application No. 1020197002594, 11 pages, dated Sep. 18, 2019.
Extended European Search Report for corresponding Application No. 17833805.9, 14 pages, dated Nov. 6, 2019.
Notification of Reasons for Refusal for corresponding Application No. JP2018-529371, 9 pages, dated Oct. 29, 2019.
International Search Report for corresponding PCT Application No. PCT/JP2017/035570, 8 pages, dated Dec. 26, 2017.
Office Action for corresponding Korean Application No. 10-2019-7002594, 10 pages, dated Mar. 26, 2020.
International Search report for related application PCT/JP2017/038937, 4 pages, dated Jan. 30, 2018.
International Preliminary Report on Patentability and Written Opinion for related PCT Application No. PCT/JP2017/035570, 20 pages, dated Apr. 9, 2020.
International Preliminary Report on Patentability and Written Opinion for related PCT Application No. PCT/JP2017/038937, 14 pages, dated May 7, 2020.
Notice of Reason for Refusal for corresponding JP Application No. 2019-214619, 6 pages, dated Sep. 2, 2020.
Notice of Reason for Refusal for corresponding JP Application No. 2019-184529, 10 pages, dated Sep. 2, 2020.
Notice of Reason for Refusal for corresponding JP Application No. 2019-221160, 6 pages, dated Sep. 18, 2020.
Notice of Reasons for Refusal for related application JP Application No. 2020104664, 10 pages, dated Mar. 29, 2021.
Notice of Reasons for Refusal for related application JP Application No. 2019549971, 8 pages, dated Apr. 20, 2021.
Extended European Search Report application EP Application No. 21159343.9, 11 pages, dated May 21, 2021.
The First Office Action for related CN Application No. 201780044599.0, 20 pages, dated Jun. 4, 2021.
First Office Action for corresponding CN Application No. 201780044603.3, 21 pages dated Jun. 29, 2021.
Office Action for related JP Application No. 2021-099339, 8 pages, dated Jun. 16, 2022.

* cited by examiner (A)

(B)

(A)

(B)

INFORMATION PROCESSING SYSTEM, OPERATION DEVICE, AND OPERATION DEVICE CONTROL METHOD

CROSS REFERENCE TO RELATED APPLICATIONS

This is a continuation application of U.S. patent application Ser. No. 16/311,778, accorded a filing date of Dec. 20, 2018, allowed, which is a national phase application of International Application No. PCT/JP2017/017909, filed May 11, 2017, which claims priority to Japanese Application No. JP 2016-146604, filed Jul. 26, 2016, the entire disclosures of which are hereby incorporated by reference.

TECHNICAL FIELD

The present invention relates to an information processing system, an operation device, and a control method for the operation device.

BACKGROUND ART

An operation device in a game machine for home use or the like detects an operation performed by a user, such as depression of a button, a shake of the operation device, or the like, and sends out information indicating the detected operation of the user to a main unit of the game machine or the like. In addition, such operation devices include an operation device that presents a tactile force sense to the user by using an actuator or the like.

SUMMARY

Technical Problem

However, the above-described conventional operation device having a tactile force sense presenting function presents a tactile force sense according to an instruction from the main unit of the game machine or the like. Thus, when a tactile force sense is to be presented in response to an operation of the user, the content of the operation of the user is sent out to the main unit, a parameter necessary to control the tactile force sense is obtained by calculation on the main unit side, the parameter is sent out from the main unit to the operation device, and the operation device performs an operation of presenting the tactile force sense on the basis of the parameter. It therefore takes time to present the tactile force sense after the operation is performed. Tactile force senses that can be presented are thus limited.

The present invention has been made in view of the above-described actual situation. It is an object of the present invention to provide an operation device capable of presenting tactile force senses in various modes and a control method for the operation device.

Solution to Problem

According to one mode of the present invention for solving the problem of the foregoing conventional example, there is provided an operation device having a movable portion movable between a first position and a second position, the movable portion being operated by a user while the operation device is gripped by the user, the operation device including: receiving means for receiving information identifying a control mode and control information determined for each control mode as an instruction related to control of a tactile force sense; and control means for controlling the tactile force sense presented to the movable portion by using the received control information in the control mode identified by the received information.

Advantageous Effect of Invention

According to the present invention, it becomes possible to present tactile force senses in various modes.

DESCRIPTION OF EMBODIMENT

Figure 1:
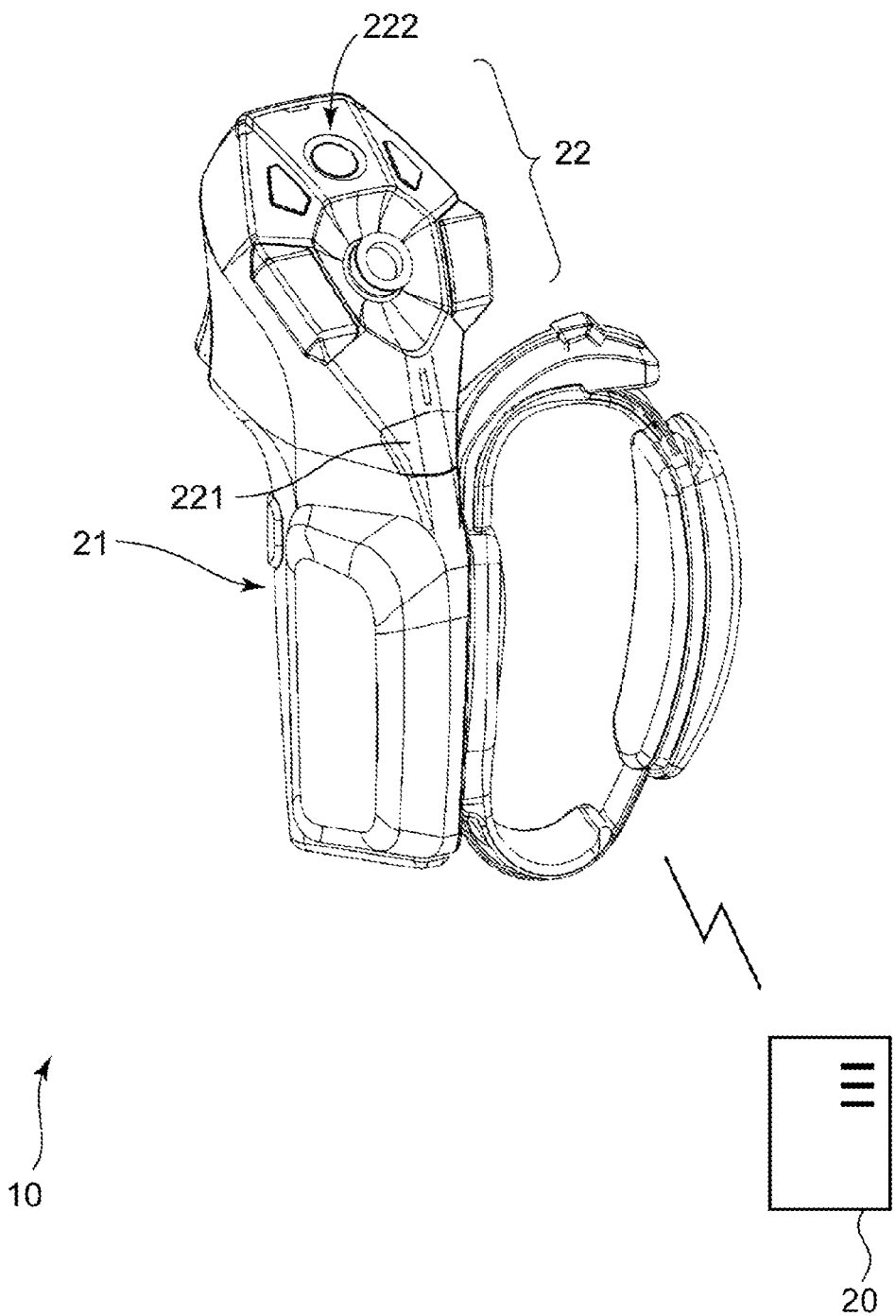
FIG. 1 is a perspective view of an operation device according to an embodiment of the present invention as viewed from a front side.

An embodiment of the present invention will be described with reference to the drawings. It is to be noted that the size, ratio, arrangement, and the like of each part in the following description are an example, and that the example of the present embodiment is not limited to sizes, ratios, and arrangements depicted in the figures and the like. As illustrated in FIG. 1, an information processing system according to the embodiment of the present invention includes an operation device 10 and a main device 20 such as a game machine for home use or the like, the main device 20 being connected to the operation device 10 by radio or wire. The operation device 10 outputs the content of an instruction operation received from a user to the main device 20. In addition, the operation device 10 receives instructions input from the main device 20, and controls various parts. Detailed operation of the operation device 10 will be described later.

Figure 2:
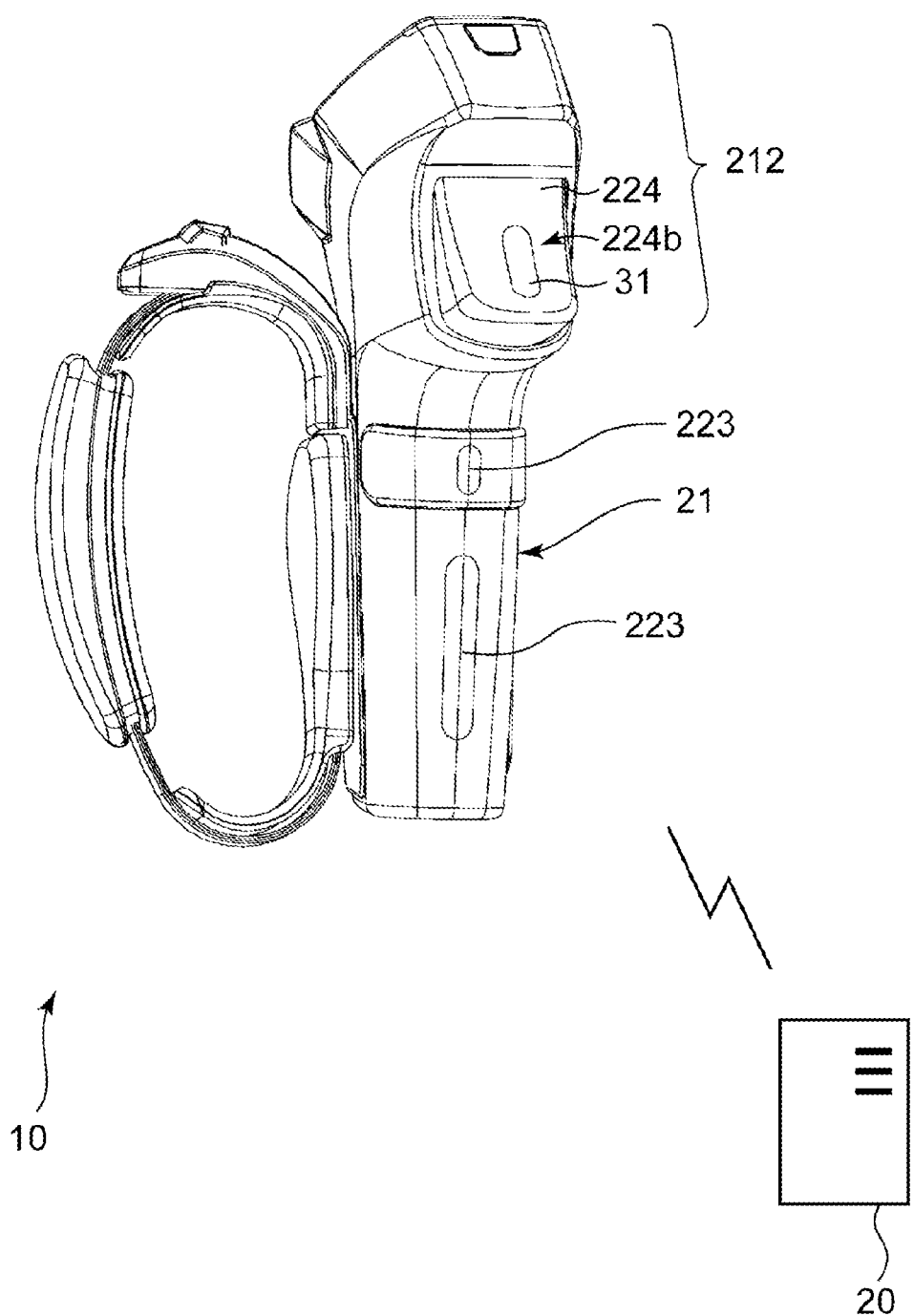
FIG. 2 is a perspective view of the operation device according to the embodiment of the present invention as viewed from a back side.

In the example of the present embodiment, the operation device 10 is set as an operation device to be fitted to either the left hand or right hand of the user. An example of the operation device 10 is as illustrated in FIG. 1 and FIG. 2. FIG. 1 is a perspective view of the operation device 10 as viewed from a front side. FIG. 2 is a perspective view of the operation device 10 as viewed from a back side.

Figure 3:
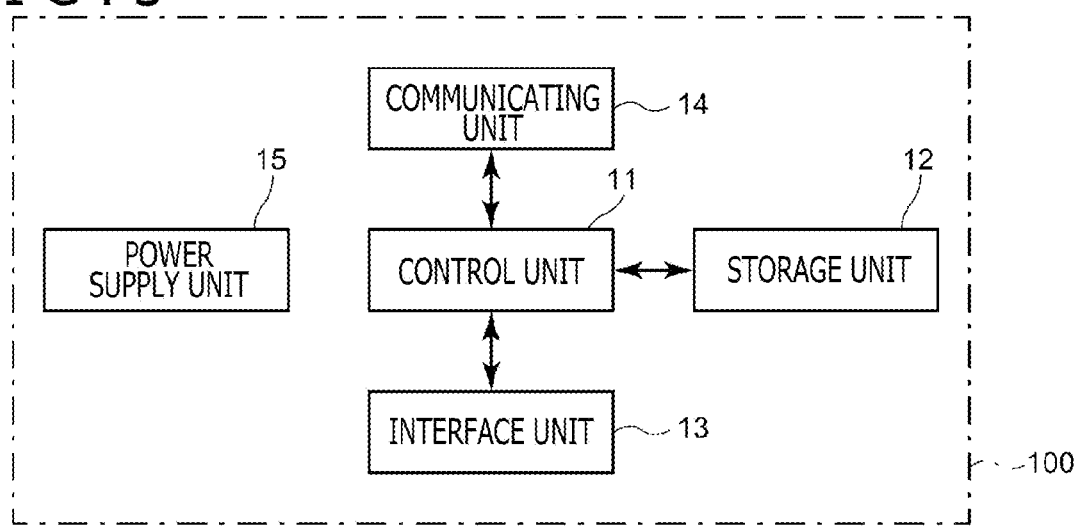
FIG. 3 is a block diagram depicting an example of a configuration of the operation device according to the embodiment of the present invention.

The operation device 10 includes a gripping portion 21 gripped by the user and an operating portion 22. The gripping portion 21 forms substantially the shape of a polygonal column. The operating portion 22 is formed continuously from the gripping portion 21. In the example of FIGS. 1 and 2, the operating portion 22 includes, on a front side, a sensor portion 221 and a button operating portion 222, and includes, on a back side, a finger sensor 223 and a rocking button 224 corresponding to a movable portion according to the present invention. As illustrated in FIG. 3, the operation device 10 also includes a circuit unit 100 within a main body of the operation device 10. The circuit unit 100 includes a control unit 11, a storage unit 12, an interface unit 13, and a communicating unit 14.

The control unit 11 is a program control device such as a microcomputer or the like. The control unit 11 operates according to a program stored in the storage unit 12. In the present embodiment, the control unit 11 receives, from the main device 20, information identifying a control mode and control information defined for each control mode as an instruction related to control for presenting a tactile force sense via the rocking button 224 as the movable portion. The control unit 11 then controls the tactile force sense to be presented to the user in response to a moving operation by the user of the rocking button 224, by using the received control information in the control mode identified by the received information. Operation of the control unit 11 will be described later. The storage unit 12 is a memory device. The storage unit 12 retains the program executed by the control unit 11. The storage unit 12 also operates as a work memory for the control unit 11.

The interface unit 13 is connected to various parts of the operating portion 22. The interface unit 13 receives various kinds of signals such as signals indicating user instructions input from the sensor portion 221, the button operating portion 222, and the like, and outputs the signals to the control unit 11. The interface unit 13 also outputs instructions input from the control unit 11 to various parts of the operating portion 22.

The communicating unit 14 includes, for example, a radio communication interface for Bluetooth (registered trademark) or the like or a wire communication interface for universal serial bus (USB), a wired local area network (LAN), or the like. The communicating unit 14 is connected to the main device 20, and sends and receives various signals to and from the main device 20.

In the present embodiment, a fixture is fixed to one side of either a left side surface or a right side surface of the operation device 10. The fixture is, for example, an annularly formed flexible belt. The user operating the operation device 10 in the present example uses the operation device 10 in a state in which the index to little fingers of the user himself/herself are passed through the fixture, and the main body of the operation device 10 is fixed at a position abutting against the base of the thumb of the user. In the example of FIGS. 1 and 2, a state is depicted in which the operation device 10 is fixed with the right side surface side of the operation device 10 pressed against the palm of a hand of the user. In addition, suppose that the size of the operation device 10 is approximately a size such that when the user wearing the operation device 10 after passing the fingers through the fixture naturally grips the operation device 10, the distal joint of the thumb of the user reaches the button operating portion 222 on the front side of the operation device 10. That is, in the present embodiment, at least a part of the buttons or the like of the operating portion 22 including the rocking button 224 are arranged in a range reached by the digit of the user when the user grips the gripping portion 21.

Specifically, when the user wearing the operation device 10 naturally grips the operation device 10, the index finger of the user is at a position touching the rocking button 224 of the operation device 10, and the user grips the gripping portion 21 with the palm of the hand, the middle finger, the third finger, and the little finger. Needless to say, even when the user opens the hand from this state, the operation device 10 does not fall because the operation device 10 is fixed to the hand of the user by the fixture.

The sensor portion 221 is disposed at a position slightly below a position that the distal joint side of the thumb of the user reaches, that is, a position to which the proximal joint side of the thumb of the user is in proximity, when the user naturally grips a device main body 210, for example. The finger sensor portion 221 detects the thumb of the user in a detectable range, the detectable range being a relatively wide angle range from the left side surface side to the right side surface side of the front of the operation device 10, and the detectable range being centered about a direction normal to the surface of the operation device 10 on the front side of the operation device 10. Then, a position at which the thumb is detected (an angle within the above-described angle range) and a distance from the finger sensor portion 221 to the thumb of the user are detected, and detection result information including these pieces of information is output to the control unit 11. The finger sensor portion 221 may be any sensor portion such as a camera, an optical sensor, a pyroelectric sensor, an electrostatic capacitive sensor, or the like.

The button operating portion 222 includes at least one button. When the user performs an operation of depressing the button, the button operating portion 222 outputs information identifying the depressed button to the control unit 11. The finger sensor 223 detects whether or not the middle to little fingers of the user are in proximity to (or touching) the gripping portion 21 of the operation device 10. Then, information indicating a result of the detection is output to the control unit 11.

The rocking button 224 corresponds to the movable portion according to the present invention, and is a button capable of rotational movement with respect to the main body of the operation device 10 between a first position where the rocking button 224 projects to the back side of the operation device 10 and a second position where the rocking button 224 is pressed in to the main body side of the operation device 10. The rocking button 224 is pressed in to the second position by the index finger or the like of the user, and is biased by an elastic body or the like to return to the first position when the user releases the finger.

The operation device 10 according to the present embodiment expresses the texture of a virtual object that the user virtually holds, by presenting a tactile force sense to the finger of the user by the rocking button 224. Specifically, the tactile force sense is presented to the user by changing a movable range of the rocking button 224, and presenting a reaction force in response to an operation of the user (a force resisting a force with which the user presses in the rocking button 224). It is to be noted that the present embodiment is not limited to the present example. The disposition and mode of the movable portion are not limited to those illustrated here as long as a tactile force sense can be presented to a part of a hand of the user by, for example, changing the movable portion to a member disposed in the vicinity of the palm of a hand of the user instead of the rocking button 224, and presenting a tactile force sense to the palm of the hand of the user.

Figure 4:
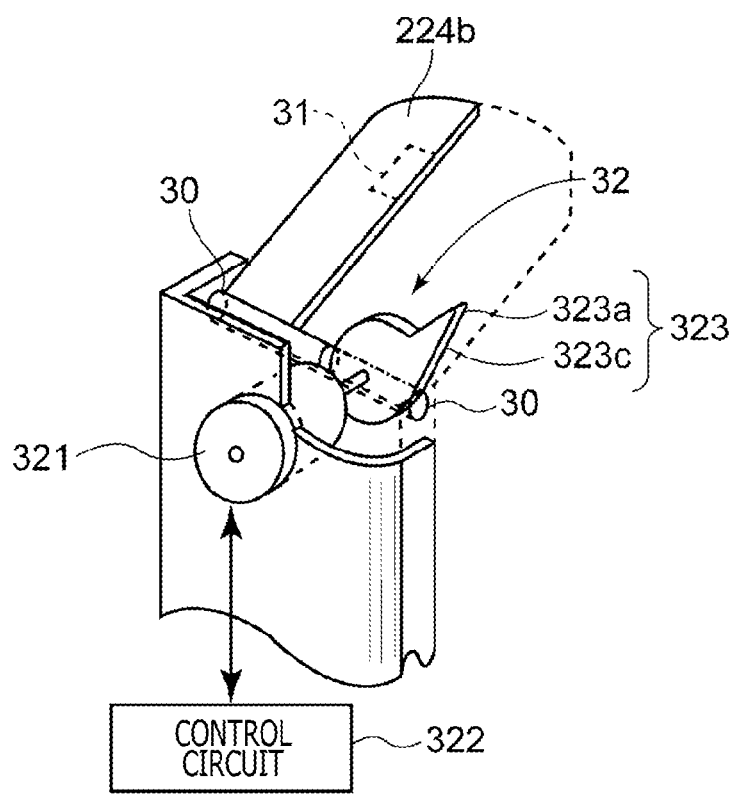
FIG. 4 is a schematic diagram depicting an example of a movable portion of the operation device according to the embodiment of the present invention.

Specifically, in the present embodiment of this example, as illustrated in FIG. 4, the rocking button 224 includes a button cover 224b as a movable member, a button cover supporting portion 30, a position sensor 31 detecting the position of the rocking button 224, and a regulating portion 32 regulating the movable range of the button cover 224b to a specified range.

Here, the position sensor 31 is a potentiometer or the like attached to a hinge as a rotational center of an arm 323. The position sensor 31 outputs information on the rotational angle of the arm 323. Alternatively, the position sensor 31 may be a potentiometer or the like attached to a hinge as a rotational center of the rocking button 224 rather than the arm 323. In this case, the position sensor 31 outputs information on the rotational angle of the rocking button 224. In addition, the regulating portion 32 includes, for example, a motor 321 as an actuator, a control circuit 322 for the motor 321, and the arm 323 as a regulating member driven by the actuator.

The button cover 224b has a surface pressed by the finger of the user. The button cover supporting portion 30 has a hinge fixed to the main body side of the operation device 10. The button cover supporting portion 30 supports the button cover 224b in a state of being rotatable in a predetermined angle range (between the first position and the second position described above) about the hinge. In addition, the button cover supporting portion 30 biases the button cover 224b toward the first position by an elastic body such as a spring or the like. Thus, in a state in which the user is not pressing, the button cover 224b moves to the first position.

The button cover 224b can be pressed in to a position abutting against the arm 323 to be described later (which position will be referred to as an abutment position) between the first position at which the button cover 224b projects to the back side of the operation device 10 and the second position at which the button cover 224b is pressed in to the main body side of the operation device 10. Accordingly, when the user grips the main body of the operation device 10, and presses the button cover 224b with the index finger, the button cover 224b moves to the abutment position without the user feeling any particular resisting force (by merely resisting only the biasing force of the button cover supporting portion 30). A tactile force sense of touching a hard object is presented when the button cover 224b abuts against the arm 323 at the abutment position.

When the user further grips with force and thereby increases the pressing force against the button cover 224b, and when the motor 321 is rotated so as to retreat the arm 323 to the main body side of the operation device 10, a tactile force sense can be presented to the user as if the object were deformed by the gripping force. At this time, a difference in hardness can be presented at the same time by changing the rotational speed of the motor 321 according to the pressing force against the button cover 224b by the user.

The motor 321 of the regulating portion 32 is a motor capable of controlling the rotational angle, the motor being a servomotor, a stepping motor, or the like. The motor 321 may be a so-called geared motor integrated with a gear head. The motor 321 performs rotating operation according to a current input from the control circuit 322.

The control circuit 322 for the motor 321 receives input of a torque control value τ and information D on a rotational direction from the control unit 11. The control circuit 322 then supplies the motor 321 with a current whose magnitude is in accordance with the torque control value τ and whose direction corresponds to the information D on the rotational direction. The motor 321 rotates in the specified rotational direction with a torque corresponding to the current. Specifically, when the rotational direction is "up," a tip end (abutting part) of the arm 323 is rotated in a direction of moving to the button cover 224b side. In addition, when the rotational direction is "down," the tip end (abutting part) of the arm 323 is rotated in a direction of moving to the main body side of the operation device 10.

When the rotational direction is "up," the tip end (abutting part) of the arm 323 is rotated in a direction of moving to the button cover 224b side, the torque produced by the motor 321 and the pressing force against the button cover 224b by the user (which pressing force is transmitted by the arm 323 as a rotational force in an opposite direction from the rotational direction of the motor 321) cancel each other, and the button cover 224b moves toward the second position at a speed corresponding to an amount by which the pressing force exceeds the torque. In addition, when the pressing force and the torque balance out, the button cover 224b is in an immobile state at a position at the time point of the balancing out.

In addition, the control circuit 322 may receive input of a rotational angle θ in place of the torque control value τ from the control unit 11. In this case, the control circuit 322 rotates the tip end (abutting part) of the arm 323 in a direction of moving to the button cover 224b side by controlling rotation of the motor 321 to the input rotational angle θ. Incidentally, control that rotates the motor to a determined rotational angle and stops the motor is widely known, and therefore detailed description thereof will be omitted here.

In yet another example, the control circuit 322 may receive input of a current value or a voltage value in place of the torque control value τ from the control unit 11. In this case, the control circuit 322 supplies a current having a magnitude corresponding to the input value to the motor 321, or applies a voltage having a magnitude corresponding to the input value to the motor 321.

The arm 323 is attached to a rotating shaft of the motor 321, and regulates the movable range of the button cover 224b according to the rotational angle θ of the motor 321. Specifically, in the example of the present embodiment, as illustrated in FIG. 4, the arm 323 is disposed on the back side of the button cover 224b, that is, the main body side of the operation device 10 (on the movement trajectory of the button cover 224b). The arm 323 includes an arm member 323a and a disk-shaped arm main body 323c. In the example of FIG. 4, the center of the disk-shaped arm main body 323c is fixed to the rotating shaft of the motor 321. The arm member 323a is formed integrally with the arm main body 323c, and is a projecting portion projecting from the arm main body 323c in a direction tangential to the circumference of the arm main body 323c.

According to the arm 323 in the example of FIG. 4, the position of the tip end (abutting portion) of the arm member 323a moves within the movable range of the button cover 224b according to the rotational angle of the motor 321. Thus, the button cover 224b can move to the abutment position abutting against the abutting portion of the arm member 323a.

Figure 5:
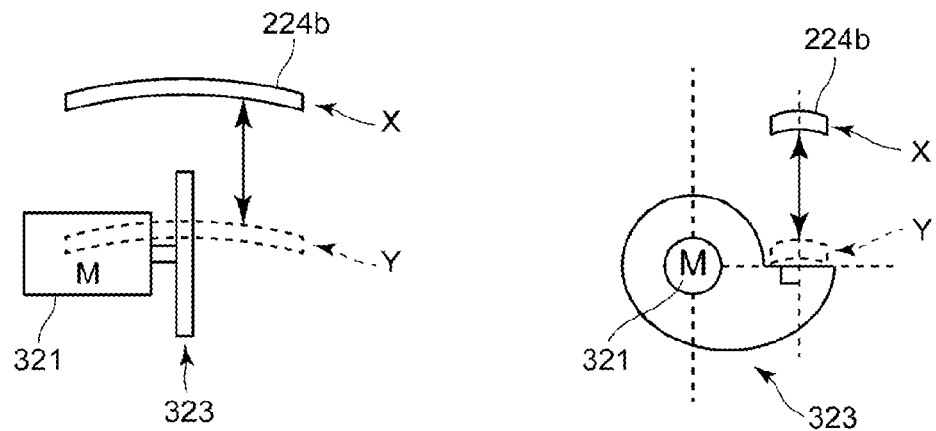
FIG. 5 is an explanatory diagram conceptually depicting relation between an arm and a button cover according to the embodiment of the present invention.
Figure 5:
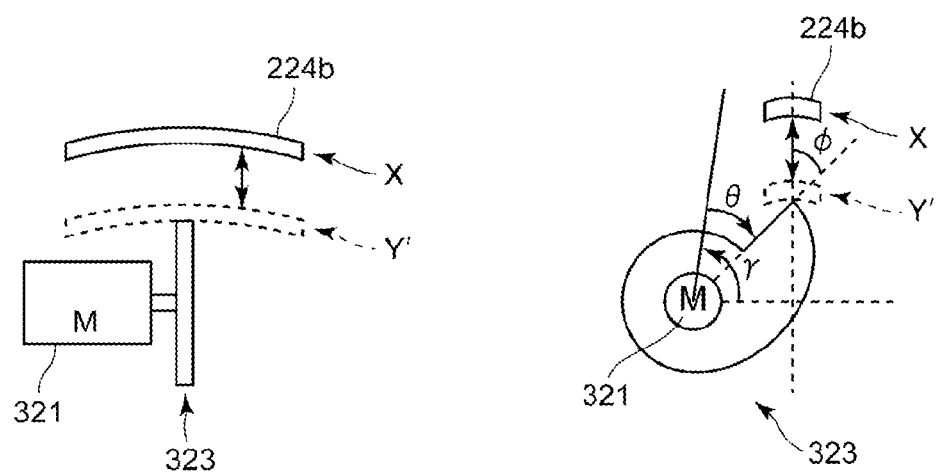

FIG. 5 is a diagram conceptually depicting relation between the arm 323 and the button cover 224b in the example of FIG. 4. As conceptually depicted in FIG. 5, when an angle (φ in FIG. 5(B)) formed between the longitudinal direction (projecting direction) of the arm member 323a and the moving direction of the button cover 224b is equal to or more than a predetermined value (for example, 90 degrees), the button cover 224b can move freely between the first position (X in FIG. 5(A)) and the second position (Y in FIG. 5(A)) without the moving range of the button cover 224b being regulated (by merely resisting only the biasing force of the button cover supporting portion 30). In the example of FIG. 5(A), the rotational angle of the arm 323 is assumed to be "0," and φ is assumed to be 90 degrees.

On the other hand, when the arm 323 is rotated by the rotational angle θ by the motor 321, and the angle φ formed between the longitudinal direction (projecting direction) of the arm member 323a and the moving direction of the button cover 224b becomes less than the predetermined value (for example, 90 degrees), the tip end of the arm member 323a is located within the movement trajectory of the button cover 224b. Incidentally, in this case, the position of an angle determined by a counterclockwise rotation by an angle γ in the drawing from an initial position of the arm 323 is set as a maximum position θmax (set in advance), the maximum position is set as a reference, and the rotational angle θ of the arm 323 is defined as an angle θ by which the arm 323 returns in the direction of the initial position from the reference angle. That is, in the present example, Rotational Angle θ=γ at the initial position, and θ=0 when a maximum rotational angle is formed. Then, the smaller the rotational angle θ of the arm 323 becomes, that is, the closer to "0" the formed angle φ becomes, the more the abutment position (position of Y' in FIG. 5(B)) of the arm member 323a and the button cover 224b approaches the first position (X in FIG. 5(B)) of the button cover 224b. Thus, an amount by which the button cover 224b can be pressed in (movable range) is regulated.

Incidentally, the regulating portion 32 is not limited to the example of the motor 321 and the arm 323 as illustrated in FIG. 4. As in a case of a linear actuator and a solenoid as a regulating member moved by the linear actuator, for example, when the regulating member can regulate the moving range of the button cover 224b to a specified range, the regulating member may regulate the moving range of the button cover 224b by linearly moving in the moving direction of the button cover 224b and having one end side of the regulating member abut against the button cover 224b.

The main device 20, for example, includes a camera and images the user. In each predetermined timing, the main device 20 detects the position of the hand of the user within a real space, and obtains, by calculation, a virtual position of the hand of the user within a game space, the virtual position corresponding to the detected position within the real space. Then, a tactile force sense to be presented to the hand of the user is determined as game processing on the basis of information on the obtained virtual position. As an example, when the main device 20 detects that the user is holding a gun in a game, and pulling a trigger, the main device 20 outputs, to the operation device 10, an instruction to perform control so as to present a tactile force sense when the trigger of the gun is pulled.

Figure 6:
FIG. 6 is a functional block diagram depicting an example of the operation device according to the embodiment of the present invention.

Description will next be made of operation of the control unit 11 of the operation device 10 according to the embodiment of the present invention. In the present embodiment, as illustrated in FIG. 6, the control unit 11 includes: a receiving unit 51 that receives an instruction related to control of a tactile force sense; a tactile force sense control unit 52 that generates an instruction for controlling the tactile force sense to be presented to the user in response to an operation of the rocking button 224 by the user on the basis of the received instruction; and an output unit 53 that outputs the generated instruction.

Figure 7:
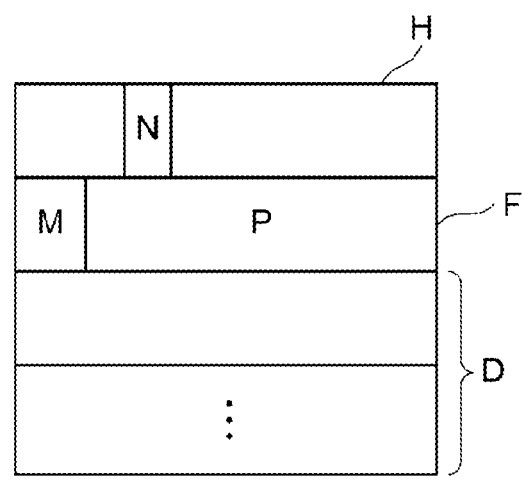
FIG. 7 is an explanatory diagram depicting an example of the content of a packet transmitted and received in an information processing system according to the embodiment of the present invention.

The receiving unit 51 receives the instruction related to control of the tactile force sense from the main device 20. In the present embodiment, this instruction is transmitted in a state of being included in an instruction data packet transmitted repeatedly in each predetermined timing from the main device 20. Here, the transmission timing of the instruction data packet may be approximately timing of 10 to 100 Hz (timing of 10 to 100 times per second). In addition, as illustrated in FIG. 7, the instruction data packet includes a header part H including a packet identifier (N), a tactile force sense instruction part F, and an other data part D. In addition, the tactile force sense instruction part F includes information (M) identifying a control mode and control information (P) defined for each control mode.

The receiving unit 51 receives the information (M) identifying the control mode and control information (P) defined for each control mode by receiving the packet. A concrete example of these pieces of information will be described later.

The tactile force sense control unit 52 controls the tactile force sense presented in response to a moving operation of the rocking button 224 as the movable portion by using the control information received together with the information identifying the control mode in the control mode identified by the information received in the receiving unit 51. In the example of the present embodiment, the tactile force sense control unit 52 controls the tactile force sense presented to the user by controlling the motor 321 as an actuator. This operation of the tactile force sense control unit 52 will be described later in detail.

The output unit 53 outputs a control instruction (a torque control value, a current value, a voltage value, or the like) input from the tactile force sense control unit 52 to the control circuit 322 for the motor 321.

The operation of the tactile force sense control unit 52 will be described in the following by using concrete examples. In an example of the present embodiment, control modes specified by instructions from the main device 20 include:

(1) a first control mode that controls the actuator by specifying a target position of the actuator and information of a control gain, (2) a second control mode that controls the actuator by specifying the voltage value of a voltage supplied to the actuator or the current value of a current supplied to the actuator, and (3) a third control mode that instructs the operation device 10 side to control the actuator by specifying which setting information to use among a plurality of pieces of setting information in which control information for positional ranges of the actuator or the movable portion is set.

(Example of Specifying Target Position and Gain)

First, in the case of (1) specifying the target position of the actuator and the information of the control gain (first control mode), the information of the control gain which information is received from the main device 20 includes a gain (p gain p) for a position error and a gain (d gain d) for a speed. In this case, the tactile force sense control unit 52 receives, as positional information of the actuator from the position sensor 31, information on the rotational angle θ of the arm 323 rotated by pressing in the rocking button 224. In the example here, the target position of the actuator which target position is included in control information is specified as the rotational angle θt of the arm 323.

Then, letting G be a gain constant, the tactile force sense control unit 52 defines the torque control value τ output to the control circuit 322 of the motor 321 as the actuator as $$\tau = (p \times |\theta - \theta t| + d \times \Delta\theta)/Gk$$

where Δθ is a difference between a value θp input from the position sensor 31 last time and a value θ input from the position sensor 31 this time, that is, $$\Delta\theta = \theta - \theta p$$

|x| denotes calculation of an absolute value of x. The tactile force sense control unit 52 outputs the torque control value τ calculated here to the output unit 53.

Further, in the case of the present example, on the basis of a difference θ−θt between an actual angle of the arm 323 and a target position, the tactile force sense control unit 52 outputs, to the output unit 53, the rotational direction of the motor 321 as "up" when θ−θt>0 or as "down" otherwise. Incidentally, the determination of "up" or "down" may be made on the basis of the sign of the torque control value τ without using θ−θt, and "up" may be output to the output unit 53 when τ>0 or "down" may be output to the output unit 53 otherwise. This takes into consideration a fact that, depending on a control method, the rotational direction of the motor 321 can be "down" even when θ−θt>0.

Incidentally, the tactile force sense control unit 52 in the present example may set the torque control value τ to "0" and output the torque control value τ to the output unit 53 when |θ−θt| is less than a predetermined value.

In addition, the target position of the actuator may be specified as information on the position of the rocking button 224 as the movable portion (rotational angle). In this case, the position sensor 31 outputs information on the rotational angle of the rocking button 224 rather than that of the arm 323.

(Example of Specifying Voltage Value or Current Value)

In addition, in the case of (2) specifying the voltage value of a voltage supplied to the actuator or the current value of a current supplied to the actuator (second control mode), the tactile force sense control unit 52 outputs the current value received or the voltage value received to the output unit 53 as it is. In the present example, receiving the input of the current value or the voltage value via the output unit 53, the control circuit 322 supplies the current value or the voltage value to the motor 321. The receiving unit 51 in the present example receives information indicating a rotational direction (information indicating "up" or "down") from the main device 20 together with the current value or the voltage value. The tactile force sense control unit 52 then outputs the information indicating the rotational direction to the output unit 53 as it is.

(Example of Specifying Duration)

In the example of specifying the voltage value or the current value, the receiving unit 51 may receive, from the main device 20, information identifying the second control mode and information related to a duration of control together with the current value or the voltage value.

In this case, the tactile force sense control unit 52 clocks an elapsed time from a time point of outputting the current value or the voltage value to the control circuit 322 by using clocking means not depicted (which clocking means may be publicly known clocking means that can be implemented by a clock signal generating unit and a counter, for example), and instructs the control circuit 322 to stop the operation of the motor 321 (for example, outputs "0" as the current value) when the duration specified by the received information has passed. According to this, even when information related to control of the actuator is not newly received from the main device 20, it is possible to end processing at a point in time that the specified time has passed, and present a tactile force sense intended by the processing performed on the main device 20 side even when communication with the main device 20 is interrupted.

(Example of Specifying Control Pattern)

Description will next be made of an example of (3) instructing the operation device 10 side to control the actuator by specifying which setting information to use among a plurality of pieces of setting information in which control information for positional ranges of the actuator or the movable portion is set (third control mode).

Incidentally, the positional range of the actuator in the present embodiment actually represents the range of the rotational angle of the arm 323. However, the range of the angle may be the range of the rotational angle of the rotating shaft of the actuator itself, or may be otherwise (a case where the arm 323 is connected via a reduction gear or the like). In the latter case, the position on an output side of the reduction gear corresponds to the position of the actuator.

Figure 8:
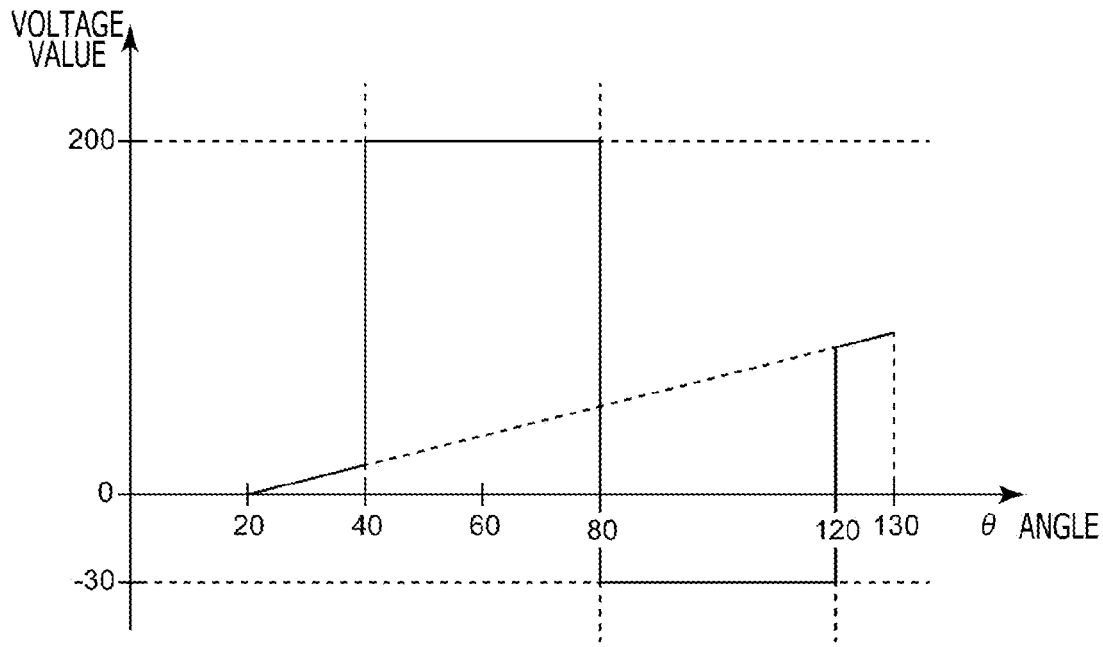
FIG. 8 is an explanatory diagram depicting an example of setting information used by the operation device according to the embodiment of the present invention.
Figure 8:
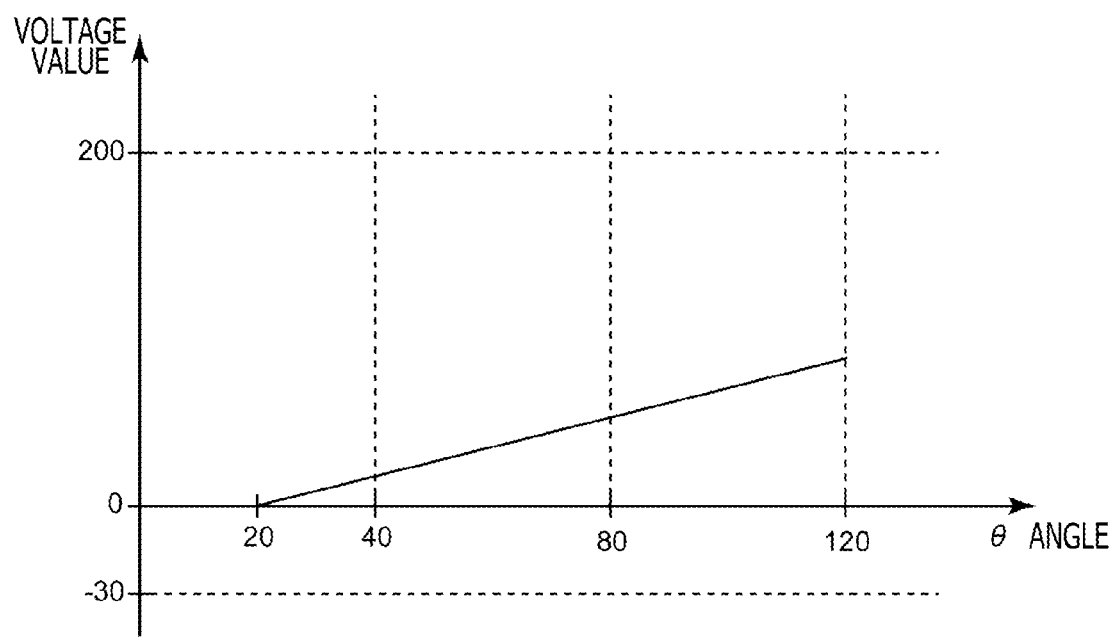

In the present example, the storage unit 12 of the operation device 10 stores, in advance, setting information including at least one set of a positional range of the actuator or the movable portion and control information. As illustrated in FIG. 8, which represents an example of shooting a gun in a game, for example, this information includes a set of information θ1min indicating a lower limit of the positional range as information indicating the positional range of the actuator, a target position θt1=40 as the control information, and control gains p1 and d1, or a set of information θ2min indicating a lower limit of the positional range as information indicating the positional range of the actuator and information CV on the voltage value (or information CI on the current value) as the control information. Incidentally, an example of using the positional range of the actuator is illustrated in FIG. 8 and the following description. However, in a case of using the positional range of the movable portion, it suffices to use information indicating the positional range of the movable portion in place of the positional range of the actuator in FIG. 8 and the following description.

The tactile force sense control unit 52 in the present example receives information on the rotational angle θ of the arm 323 or the rocking button 224 as the movable portion, and refers to the control information associated with the information on the positional range including the received rotational angle θ in the specified setting information. When the control information is a set of the target position and the control gains, the tactile force sense control unit 52 controls the actuator by processing similar to that of the first control mode. In addition, when the referred-to control information is the voltage value or the current value, the tactile force sense control unit 52 controls the actuator by processing similar to that of the second control mode.

Specifically, in the example of FIG. 8, when the positional range becomes less than θ2min (for example, 40), an "up mode" is set, and control is performed with the target position θt1 and the control gains p1 and d1 (the rotational direction is up, though not depicted) in an interval from θ1min=20 to θ2min=40 as a lower limit of a next positional range. In addition, during this "up mode," control is performed such that the voltage value CV is 200 in an interval from θ2min=40 to θ3min=80 as a lower limit of a next positional range, and control is performed such that the voltage value CV is −30 in an interval from θ3min=80 to θ4min=125 as a lower limit of a next positional range (FIG. 8(A), where a positive voltage value CV indicates control in an up rotational direction, and a negative voltage value CV indicates control in a down rotational direction).

In addition, when the positional range becomes equal to or more than θ4min (θ4min is, for example, 125 in a case where θ=130 is a maximum angle), a "down mode" is set, and control is performed with the target position θt2=20 and control gains p2 and d2 as the control information (FIG. 8(B), where the rotational direction is down in this case). Thus, the control information related to the first control mode and the control information related to the second control mode may be mixed in the setting information.

According to the present example, as illustrated in FIG. 8(A), when the user presses in the rocking button 224 from the initial position (the rotational angle θ of the arm 323 is zero at the time of the initial position), the user presses in the rocking button 224 without receiving any resistance at all (while merely resisting the biasing force attempting to return the rocking button 224 to the initial position) until the position of the arm 323 becomes θ=20. The user receives a presentation of a tactile force sense such that the resistance gradually increases while the position of the arm 323 is in a range from θ=20 to θ=40. A tactile force sense of a relatively strong reaction force (force attempting to push back) is presented while the position of the arm 323 is in a range from θ=40 to θ=80. When the user presses in the rocking button 224 until the position of the arm 323 becomes θ=80, the user receives a tactile force sense as if the reaction force disappeared suddenly.

This precisely corresponds to a state in which a tactile force sense corresponding to a kickback feeling of a gun, as it were, is presented, that is, corresponds to a sequence in which there is play at first when the trigger of a pistol or the like is pulled, there is a slight reaction force until a hammer is pulled, a strong force thereafter becomes necessary to return the hammer, a bullet is fired when the hammer then returns, and the trigger is set free.

In addition, the tactile force sense control unit 52 may estimate a speed or a force and change a gain on the basis of a change speed of the positional information of the arm 323, that is, on the basis of movement of a finger of the user. Specifically, the control gain is made to differ between a case where the movement of the finger of the user (change speed of the positional information of the arm 323) is less than a threshold value determined in advance and a case where the movement of the finger of the user exceeds the threshold value. For example, the control gain may be set stronger (so as to present a stronger reaction force) in the case where the movement of the finger of the user (change speed of the positional information of the arm 323) exceeds the threshold value determined in advance than in the case where the movement of the finger of the user is less than the threshold value.

(Vibration Presentation)

In the present embodiment, a vibration may also be presented to the user by vibrating the rocking button 224. Specifically, the main device 20 gives an instruction to vibrate the rocking button 224 between the first position on the upper side and the second position on the lower side.

Then, when the control unit 11 of the operation device 10 receives the instruction to present the vibration, the control unit 11 switches, in each predetermined timing, between the first control mode in which the target position of the actuator is set at the first position and the second control mode in which information setting the rotational direction to "down" is output together with the current value or the voltage value.

When the vibration is presented by the method of thus alternately switching between the first control mode and the second control mode, the position of a vibration limit on the upper side (first position) can be controlled. In addition, according to this method, also for the second position, a distance by which the arm 323 moves (which distance is equal to a distance by which the rocking button 224 moves when the user is pressing in the rocking button 224) depends on the length of a time during which control in the second control mode is performed. When switching from the second control mode to the first control mode is performed in each fixed time, the second position is substantially constant irrespective of the magnitude of a force with which the user presses in the rocking button 224. Therefore the second position can be controlled by changing the timing of switching between the first control mode and the second control mode.

Incidentally, in the above-described case, in place of the method of alternately switching between the first control mode and the second control mode, the control unit 11 may switch the target position between the first position on the upper side and the second position on the lower side in each predetermined time in the first control mode. In addition, the second control mode may be used, and switching may be performed alternately between the rotational directions "up" and "down" in each predetermined time.

In addition, as for the timing of switching between the first control mode and the second control mode, the control unit 11 may, for example, detect the relative positions of the rocking button 224 and the arm 323 during driving in the "up" direction, perform driving in the first control mode until the arm 323 and the rocking button 224 come into contact with each other, and perform driving in the second control mode after the arm 323 and the rocking button 224 come into contact with each other.

(Control Based on Actual Vibration Range)

In addition, in the control of the vibration presentation, the following control may be performed on the basis of information on the range of the position detected by the position sensor 31. Specifically, for example, when information on the specified first and second (upper limit side and lower limit side) positions represents 20 degrees and 60 degrees, but information on the position detected by the position sensor 31 represents 20 degrees between 40 degrees and 60 degrees due to an effect of a force with which the user presses in the rocking arm, the control unit 11 controls the upper limit side or the lower limit side (for example, the second position as the lower limit side) so that the width of the vibration becomes an intended width of the vibration, that is, controls the upper limit side and the lower limit side to 40 degrees and 80 degrees, for example. Incidentally, the upper limit side may also be controlled at this time.

(Another Example: Rapid-Fire Gun)

In addition, in the example of FIG. 8, when the positional range is equal to or more than θ4min (supposing that θ=130 is a maximum angle), control may be performed with the target position θt2=125 and the control gains p2 and d2 as the control information (supposing that the rotational direction is up in this case). According to the present example, slightly returning the trigger when fully pulling the trigger and then fully pulling the trigger is repeated. In the other example, a tactile force sense can be presented as if the gun were blazing.

In addition, a method of presenting a rapid-fire feeling of a gun is not limited to the present example, but may be as follows, for example. When the positional range of the arm 323 or the rocking button 224 exceeds a predetermined value (start condition value) (when θ=100 is a maximum angle, for example, the start condition value is θ=50, which is ½ of the maximum angle), for example, the operation device 10 makes a transition to a "rapid-fire mode," and presents a vibration by switching the actuator between the up and down directions in each predetermined timing.

Specifically, when the actuator is set in the up direction, the target position θt=5 is set as the control information, and when the actuator is set in the down direction, the target position θt=95 is set as the control information (values obtained by providing a predetermined margin to a minimum value and a maximum value are set in consideration of a case where control tends to act in an overshooting manner).

In addition, in the present example, the operation device 10 ends the "rapid-fire mode" and stops controlling the actuator when the positional range of the arm 323 or the rocking button 224 becomes less than a predetermined value (stop condition value). Here, the stop condition value may be the same as the start condition value, or may be different from the start condition value. For example, the stop condition value may be on a side in closer proximity to the first position than the start condition value, or may be, for example, θ=30.

Further, it is assumed that the target position is set at a time of control of the actuator in this case. However, without limitation to this, when the actuator is set in the up direction, the voltage value CV of the voltage supplied to the actuator may be set to a negative value CV1 determined in advance, or when the actuator is set in the down direction, the voltage value CV of the voltage supplied to the actuator may be set to a positive value CV2 determined in advance (it is assumed in this case that a negative voltage value CV indicates control in the up rotational direction and that a positive voltage value CV indicates control in the down rotational direction), and the voltage value CV may be alternately set to CV1 and CV2 in each predetermined timing to present a vibration. The presentation of this vibration may adopt a method of alternately performing first control and second control, as described earlier, instead of alternately setting the voltage value.

Incidentally, the start condition value and the end condition value described above may be provided with hysteresis. Specifically, when the positional range of the arm or the rocking button 224 before the "rapid-fire mode" is set (before a start of determination processing of the start condition value) exceeds the start condition value, control may be performed so as not to make a transition to the "rapid-fire mode" until the positional range of the arm or the rocking button 224 once falls below the start condition value and thereafter exceeds the start condition value again.

In addition, during the "rapid-fire mode," in consideration of a case where control tends to act in an overshooting manner, control may be performed so as to end the "rapid-fire mode" when a time during which the positional range of the arm 323 or the rocking button 224 is less than the stop condition value exceeds a threshold value determined in advance, rather than ending the "rapid-fire mode" immediately when the positional range of the arm 323 or the rocking button 224 falls below the stop condition value. When control is thus performed as if filtering is performed, a natural rapid-fire feeling can be presented. Incidentally, this filtering may be performed by a low-pass filter such as uses a moving average.

(Control by Game Program)

Further, the main device 20 may output an instruction to set the control gain as game processing. In a case of a game in which rapid fire of a gun is performed, for example, the control gain may be controlled to be changed according to the number of remaining bullets.

In addition, the main device 20 may perform control that reduces the gain according to a predetermined condition. Specifically, the control gain may be controlled (for example, control may be performed which reduces the control gain) on the basis of a total play time (sum of play time in each round), the number of times of game play, a time from a start of play in each round (play time), or an elapsed time from a start of a predetermined operation as this condition. For example, in a case where an operation of continuing firing a machine gun is performed, control is performed so as to decrease the control gain according to an elapsed time from a start of an operation of firing the machine gun. This prevents a strong vibration from being presented continuously, while providing a feeling of performing rapid fire of the machine gun. Operability is thereby improved.

(Another Example of Presenting Force Sense)

Further, when a force of pressing the rocking button 224 by the user is larger than the force of the actuator, the rocking button 224 cannot be raised against the force of the user, and a force sense felt as if to hit an object and be repelled by the object cannot be presented.

Accordingly, in a certain example of the present embodiment, when the positional information of the arm 323 which positional information is indicated by information input from the position sensor 31 is θ, and θt (θt>θ) is given as a target of the rotational angle of the arm 323 from the main device 20, the tactile force sense control unit 52 controls the arm 323 to rotate to the rotational angle θt by driving the actuator. At this time, the tactile force sense control unit 52 repeats, each predetermined timing, determining the positional information θ of the arm 323 which positional information is indicated by the information input from the position sensor 31, and determining whether or not the state of θt>θ is unchanged for a time determined in advance (whether or not the rocking button 224 is immovable for a predetermined time). When determining here that the rocking button 224 is immovable for the predetermined time, the tactile force sense control unit 52 may set anew the target θt of the rotational angle of the arm 323 to θt=θ−Δθ (where Δθ>0), and control the actuator.

In the present example, the rocking button 224 is pulled in instead of being raised. However, because the rocking button 224 is temporarily pulled in, the force applied to the rocking button 224 by the user is temporarily weakened. Applying a force of pushing back again in response to the weakening of the force applied to the rocking button 224 by the user causes the user to feel the force of pushing back more strongly. In addition, because of an inertial force caused by pushing back from the pulled-in position, the force of pushing back is applied more strongly. Thus, as compared with a case where no change is provided at all, a feeling similar to that of being repelled is given.

Incidentally, in the case where this control is performed, the tactile force sense control unit 52 may correct the target value to θt−Δθ and perform control in advance when the target value θt of the rotational angle of the arm 323 is given. Thus, the arm 323 is rotated by an extra Δθ in advance, and the regulated range of the rocking button 224 is set to a position at which the rocking button 224 is raised by a corresponding amount. This enables control of pulling in by Δθ to be performed at any time afterward.

In addition, when the force with which the user presses the rocking button 224 is relatively large, an amount of change δθ in the positional information θ of the arm 323 which positional information is indicated by the information input from the position sensor 31, the amount of change δθ being obtained per unit time while the tactile force sense control unit 52 is performing control that rotates the motor 321 in the "up" direction, for example, may be less than a predetermined threshold value δθth.

When such a state occurs, the tactile force sense control unit 52 may provide a period of stopping rotational control of the arm 323. Specifically, when the tactile force sense control unit 52 intends to perform control with the target of the rotational angle of the arm 323 set at θt, the tactile force sense control unit 52 may perform control in N (integer N>1) divided stages instead of performing control with the target of the rotational angle of the arm 323 set at θt as the final target. That is, Δθt=(θt−θ)/N is set (where θ denotes the rotational angle of the arm 323 at a point in time of a start of this control), and control is performed which effects movement in steps of Δθt at time intervals ΔT determined in advance from the rotational angle θ of the arm 323 at the point in time of the start.

Similarly, also in the case where control is performed by the voltage value supplied to the motor 321, instead of performing control by the voltage value CV to be specified, a predetermined voltage value CV' is supplied to the motor 321 at time intervals ΔT determined in advance for only an infinitesimal time τ that can be different from ΔT (suppose that the rotational direction is a direction in which the original control is performed).

Here, the predetermined voltage value CV' may be a maximum voltage CVmax that can be supplied to the motor 321, or a voltage value higher than the voltage value CV to be specified may be calculated as the predetermined voltage value CV' by a predetermined method. For example, it suffices to perform multiplication by a predetermined value larger than one, or perform addition of a predetermined value larger than zero. In either case, a setting is made such that CV'=CVmax when a result of the calculation exceeds the maximum voltage CVmax that can be supplied to the motor 321.

Thus controlling the rotational angle of the arm 323 stepwise, or discretely, as it were, instead of controlling the rotational angle of the arm 323 linearly until the target rotational angle is achieved can effectively provide the user with a feeling that the rocking button 224 is being raised.

Further, when the tactile force sense control unit 52 is given θt as the target of the rotational angle of the arm 323 from the main device 20, the tactile force sense control unit 52 compares this θt with the positional information θ of the arm 323 which positional information is indicated by the information input from the position sensor 31, and obtains σ(θt−θ). Here, σ(X) denotes the positive or negative sign of X. Suppose that σ(X)=−1 when X<0, that σ(X)=1 when X>0, and that σ(X)=0 when X=0.

Then, the tactile force sense control unit 52 sets the target of the rotational angle of the arm 323 to θt'=θ−σ(θt−θ)×Δθ (Δθ is an infinitesimal angle determined in advance), and controls the actuator for only a time τ (this τ is an infinitesimal time determined in advance) so as to set the arm 323 at the rotational angle θt'. After the time τ thereafter passes, the tactile force sense control unit 52 sets the target of the rotational angle of the arm 323 to the target angle θt specified from the main device 20, and starts controlling the actuator so as to set the arm 323 at the rotational angle θt.

According to the present example, the arm 323 is controlled so as to move temporarily in an opposite direction from the specified moving direction (preparatory operation), and thereafter the arm 323 is controlled so as to move in the specified direction (main operation). When the preparatory operation is thus performed before the main operation, movement of the main operation is emphasized, and the user feels the movement at a time of the main operation more strongly.

Incidentally, the arm 323 may be rotatable to the outside of an initial movable range (whole of a movable range not regulated by the arm 323) of the rocking button 224 to make this operation more effective. That is, in the example of FIG. 5(A), when the button cover 224b of the rocking button 224 can be pressed in to the position Y, the arm 323 may be rotatable until the rotational angle θ becomes a negative rotational angle. At this time, the button cover 224b may be regulated by another member so as not to be able to move below the position Y, and may be in a state of not abutting against the arm 323. However, the arm 323 can be pulled in in an opposite direction from the original rotational direction.

Incidentally, this control can be applied also to the case where the voltage value of the voltage supplied to the actuator or the current value of the current supplied to the actuator is specified (second control mode). Specifically, when the tactile force sense control unit 52 receives, from the main device 20, information indicating the rotational direction (information indicating "up" or "down") together with the current value or the voltage value, the tactile force sense control unit 52 instructs the output unit 53 to set the rotational direction to an opposite direction from the direction received from the main device 20, and set the current or voltage to be supplied to the actuator to a predetermined current value or a predetermined voltage value (which may be a current value or a voltage value determined in advance, or may be the input value itself). Then, when a time τ (suppose that this τ is an infinitesimal time determined in advance as in the foregoing) thereafter passes, the tactile force sense control unit 52 outputs the information indicating the rotational direction and the information indicating the current value or the voltage value, which information is received from the main device 20, to the output unit 53 as they are.

Thus, the arm 323 is controlled so as to move temporarily in an opposite direction from the specified moving direction (preparatory operation), and the arm 323 is thereafter controlled so as to move in the specified direction (main operation).

In addition, the operations of these various force sense presentations may be used in combination with each other. For example, when the main operation is performed after the preparatory operation, the rotational control of the arm 323 may be performed discretely, as it were, while a period of stopping the rotational control is provided.

(Prevention of Chattering)

Incidentally, in an example of the present embodiment, the main device 20 may detect a speed at which the user moves the operation device 10, and make an actuator control parameter sent out to the operation device 10 differ according to the detected speed. Here, the speed at which the user moves the operation device 10 may be detected on the basis of an image obtained by imaging the user by a camera or the like connected to the main device 20. In a case where the operation device 10 has an acceleration sensor (not depicted), and sends out the value of acceleration detected by the acceleration sensor, the speed may be detected on the basis of an integrated value (accumulated value) of the acceleration detected by the acceleration sensor.

Specifically, this parameter is a cutoff frequency of a low-pass filter. The output unit 53 of the control unit 11 of the operation device 10 calculates an average of input values (torque control values, current values, or the like) from the tactile force sense control unit 52 for immediately preceding M times corresponding to the cutoff frequency (the value of M changes according to the cutoff frequency) (that is, calculates a moving average for the immediately preceding M times), and outputs a result of the calculation to the control circuit 322. The faster the movement of the operation device 10 by the user, the lower the cutoff frequency set by the main device 20.

Thus, in a case where the main device 20 presents a tactile force sense when the position of the hand of the user in the virtual space of a game touches an object disposed within the virtual space, for example, the movement of the actuator becomes slower as the user moves the hand faster (the operation device 10 fitted to the hand is moving faster). As the user moves the hand more slowly (in a case where the hand is moved slowly along the surface of an object within the virtual space, for example), on the one hand, the actuator is driven along the shape of the object within the virtual space, and a corresponding tactile force sense is presented.

Consequently, the actuator is prevented from being controlled so as to vibrate finely (such that chattering occurs) according to the position of the object within the virtual space when the user is moving the hand fast.

Further, in a case where a vibrating device such as a vibrator or the like is fixed within the gripping portion 21, this control may be performed for the vibrating device, and the main device 20 may detect the speed at which the user moves the operation device 10, and make a vibrating device control parameter sent out to the operation device 10 differ according to the detected speed. That is, the main device 20 sets the cutoff frequency of the low-pass filter for the vibrating device lower as the user moves the operation device 10 faster.

(Operation)

The information processing system according to the embodiment of the present invention has the above configuration, and operates as in the following example. In each predetermined timing (for example, timing of each frame), the main device 20 detects the position of the hand of the user, and determines the content of a tactile force sense to be presented to the hand of the user according to game processing or the like on the basis of the detected position of the hand. In the present embodiment, the tactile force sense to be presented to the hand of the user is replaced by presenting the tactile force sense to a finger of the user. The user receives the presentation of the tactile force sense only by the finger. However, the user feels as if the tactile force sense were presented to the whole of the hand.

Figure 9:
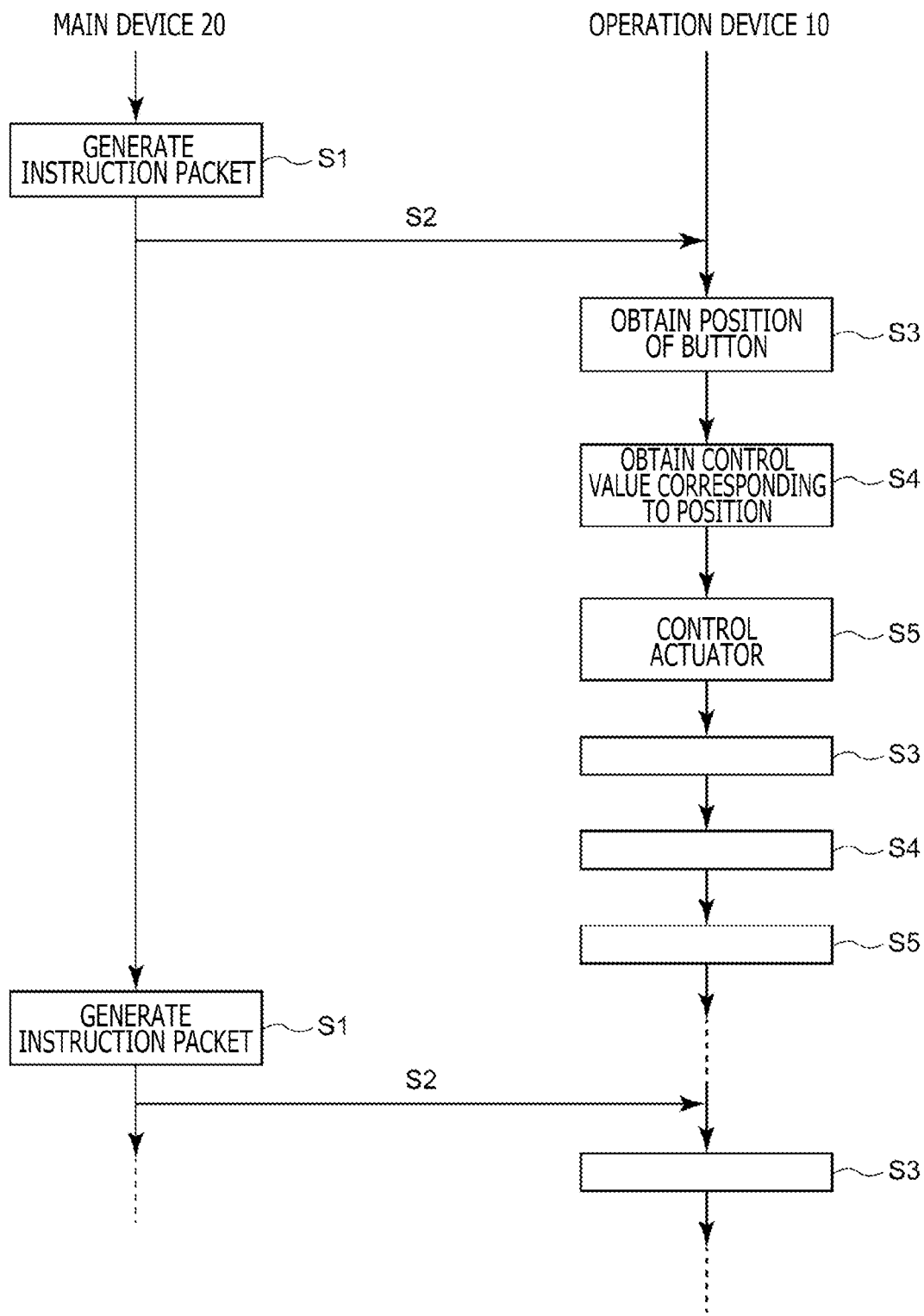
FIG. 9 is a flowchart depicting an example of operation of the information processing system according to the embodiment of the present invention.

In the present embodiment, as illustrated in FIG. 9, in each predetermined timing described above, the main device 20 generates a packet (referred to as an instruction packet) including information specifying a control mode and control information or setting information as the content of a tactile force sense to be presented to the hand of the user (S1), and sends out the packet to the operation device 10 (S2). Specifically, suppose here that a packet is sent out which includes information specifying the third control mode as the control mode and information specifying the setting information illustrated in FIG. 7.

The operation device 10 obtains, by the position sensor 31, information on the rotational angle θ of the arm 323 (or the rocking button 224) as the positional information of the actuator (S3). Then, the specified setting information is referred to, and a control value corresponding to the rotational angle obtained in processing S3 is obtained (S4). Specifically, when the obtained rotational angle is θ=30, the target position θt1 and the control gains p1 and d1, which are a control value between θ1min=20 and θ2min=40 as the lower limit of a next positional range, are obtained as the control value. Then, letting G be a gain constant, the torque control value τ output to the control circuit 322 for the motor 321 as the actuator is defined as $$\tau = (p \times |\theta - \theta t| + d \times \Delta\theta)/Gk$$

The calculated torque control value τ is output to the control circuit 322, and rotational control of the motor 321 is performed (S5).

The operation device 10 repeats the processing of S3 to S5 until a new instruction packet is received from the main device 20. The timing of this repetition is, for example, a cycle of approximately 1 kHz. Meanwhile, rotational control of the motor 321 is performed according to the rotational angle of the arm 323 (or the rocking button 224) on the basis of the control value set in the setting information.

Thus, in the present embodiment, until a next instruction packet is received from the main device 20, the operation device 10 autonomously performs the operation of presenting a tactile force sense on the basis of the content of the instruction packet received previously. It is therefore possible to perform the presentation of a tactile force sense in accordance with operation timing, and present tactile force senses in various modes.

(Example of Presenting Bow Drawing Feeling)

In addition, the main device 20 may not only determine a tactile force sense to be presented on the basis of the position of one of a left hand and a right hand to which hand to present the tactile force sense (hand to which the operation device 10 is fitted in a case where the operation device 10 is fitted to one hand) but also determine a tactile force sense to be presented on the basis of the positions of the left and right hands. For example, the main device 20 may set the second control mode as the control mode of a tactile force sense to be presented, and increase the current value as a distance between the hands is increased (suppose that the rotational direction is up). According to the present example, when an operation of drawing a bow is performed, for example, a tactile force sense can be presented so as to make a finger of the hand of the user wearing the operation device 10 feel a force such as pushes out to the outside (such as opposes a drawing force) as the distance between the left and right hands is increased (as a bow is drawn more strongly).

When such a third control mode is provided, a desired force sense presentation can be made to be performed by merely specifying one of the pieces of setting information stored on the operation device 10 side in advance without a developer of a game program or the like on the main device 20 side specifying fine control.

(Modifications)

Needless to say, in the third control mode, instead of the main device 20 transmitting an instruction to select one of the pieces of setting information stored by the operation device 10 in advance, a developer of a game program or the like on the main device 20 side may specify fine control. Specifically, the main device 20 may send out information indicating the content of setting information (information including at least one set of the positional range of the actuator and control information) together with an instruction for the third control mode, and the operation device 10 may perform operation as the third control mode using the information as setting information.

In the present example, the operation device 10 may be further enabled to accumulate and store, in the storage unit 12, the information indicating the content of the setting information which information is received from the main device 20, and thereafter receive a specification. In this case, the main device 20 also sends out information (identification information) identifying the setting information to the operation device 10, and the operation device 10 stores the information indicating the content of the setting information in association with the identification information. It is therefore possible to receive a specification of the setting information later by using the identification information from the main device 20.

Incidentally, the operation device 10 according to the present embodiment may not only present a tactile force sense in response to a moving operation of the movable portion such as the rocking button 224 or the like, but also present a tactile force sense even when the movable portion is not moved.

In addition, in the example thus far, description has been made supposing that the button cover 224b and the arm 323 are not interlocked with each other. However, the button cover 224b and the arm 323 may be configured to be coupled to each other and interlocked with each other.

Also in the present example, the arm 323 is attached to the rotating shaft of the motor 321, and regulates the movable range of the button cover 224b according to the rotational angle θr of the motor 321. Then, the motor 321 performs a rotating operation by being supplied with a current from the control circuit 322 that supplies the motor 321 with the current having a magnitude corresponding to the torque control value τ input from the control unit 11.

In the present example of the present embodiment, suppose that the button cover 224b coupled to the arm 323 moves to the first position when the rotational angle θ of the motor 321 (angle on the output side of a reduction gear when the reduction gear is attached; the same applies hereinafter) is θ0, and that the button cover 224b moves to the second position when the rotational angle θ of the motor 321 is θ1 (θ0≠θ1).

Then, in the present example, while the torque control value τ is input from the control unit 11, the control circuit 322 supplies the motor 321 with a current having a magnitude corresponding to the torque control value τ. In addition, while the torque control value τ is not input from the control unit 11, whether or not the rotational angle θr of the motor 321 is equal to θ0 is determined. When the rotational angle θr of the motor 321 is not equal to θ0, a current having a magnitude determined in advance is supplied to the motor 321 to perform rotational control of the motor 321 toward the rotational angle θ0. It suffices to determine an amount of current supplied in this case experimentally as an amount of current of such a degree as to present a force of such a degree as to move the button cover 224b as a force corresponding to the biasing force that moves the button cover 224b to the first position when the button cover 224b is not pressed in the example in which the button cover 224b and the arm 323 are not coupled to each other.

(Control of Left and Right Devices)

In addition, in the present embodiment, in a case where both the left hand and the right hand of the user are fitted with operation devices 10, the main device 20 sends out an instruction related to control for presenting a tactile force sense to each of the operation devices 10 via rocking buttons 224.

The main device 20 determines, by a predetermined method, which of a tactile force sense presented by the operation device 10 fitted to the left hand and a tactile force sense presented by the operation device 10 fitted to the right hand is a main tactile force sense. This determination may be made on the basis of a specification in accordance with an application program such as a game or the like, or it may be determined that the tactile force sense presented by one of the left and right operation devices 10 on a side where the presentation of the tactile force sense is specified last is the main tactile force sense. Further, the tactile force sense presented on a side where the magnitude (for example, the magnitude of amplitude or the like) of the presented tactile force sense is larger may be determined to be the main tactile force sense.

The main device 20 weakens control on the side of one of the left and right operation devices 10 on which side the main tactile force sense is not presented. For example, when determining that the operation device 10 on the right side is presenting the main tactile force sense, the main device 20 reduces the control value (for example, the torque control value) of the tactile force sense output to the operation device 10 on the left side, and thereby reduces power consumption.

REFERENCE SIGNS LIST

10 Operation device, 11 Control unit, 12 Storage unit, 13 Interface unit, 14 Communicating unit, 15 Power supply unit, 20 Main device, 21 Gripping portion, 22 Operating portion, 30 Button cover supporting portion, 31 Position sensor, 32 Regulating portion, 51 Receiving unit, 52 Tactile force sense control unit, 53 Output unit, 100 Circuit unit, 210 Device main body, 221 Sensor portion, 222 Button operating portion, 223 Finger sensor, 224 Rocking button, 224b Button cover, 321 Motor, 322 Control circuit, 323 Arm, 323a Arm member, 323c Arm main body

The invention claimed is:

1. An operation device, comprising:
a movable portion, movable between a first position and a second position via direct contact pressure by a user while the operation device is gripped by the user;
a receiving circuit for receiving information identifying a control mode, among a plurality of control modes, and control information determined for such control mode as an instruction related to control of a tactile force sense; and
a controller for controlling the tactile force sense presented to the movable portion by using the received control information in the control mode identified by the received information, wherein:
the receiving circuit receives setting information taken from one or more pre-stored profiles,
the control mode establishes which of the one or more pre-stored profiles is selected for use by the controller,
the controller controls the tactile force sense presented to the movable portion in response to the selected one of the pre-stored profiles,
the movable portion includes an actuator, where the actuator is not movable via the direct contact pressure by the user,
when the receiving circuit receives, as the instruction related to the control of the tactile force sense, information including information identifying a first control mode, a target position as control information determined in advance for the first control mode, and a control gain of the actuator, and
the controller controls the tactile force sense presented to the movable portion by performing control of the actuator on a basis of a difference between a position of the actuator and the target position and the information of the control gain.

2. An information processing system, comprising:
an operation device having a movable portion, movable between a first position and a second position via direct contact pressure by a user while the operation device is gripped by the user; and
a main device configured to communicate with the operation device, and output an instruction related to control of a tactile force sense provided to the user;
the operation device including
a receiving circuit for receiving information identifying a control mode, among a plurality of control modes, and control information defined for such control mode as an instruction related to control of the tactile force sense from the main device, and
a controller for controlling the tactile force sense presented to the movable portion by using the received control information in the control mode identified by the received information, wherein:
the receiving circuit receives setting information taken from one or more pre-stored profiles,
the control mode establishes which of the one or more pre-stored profiles is selected for use by the controller,
the controller controls the tactile force sense presented to the movable portion in response to the selected one of the pre-stored profiles,
the movable portion includes an actuator, where the actuator is not movable via the direct contact pressure by the user,
when the receiving circuit receives, as the instruction related to the control of the tactile force sense, information including information identifying a first control mode, a target position as control information determined in advance for the first control mode, and a control gain of the actuator, and
the controller controls the tactile force sense presented to the movable portion by performing control of the actuator on a basis of a difference between a position of the actuator and the target position and the information of the control gain.

3. The information processing system of claim 2, wherein the at least one pre-stored profile contains at least one of: (i) parametric data representing a plurality of possible positions of the movable member between the first position and the second position, inclusive, (ii) parametric data representing a plurality of possible tactile forces presented to the movable portion, and (iii) a functional relationship between the plurality of possible tactile forces as a dependent variable and the plurality of possible positions of the movable member as an independent variable.

4. The information processing system of claim 2, wherein
when the receiving circuit receives, as the instruction related to the control of the tactile force sense, information identifying a second control mode and information of a control voltage value or a control current value of the actuator as control information determined in advance for the second control mode,
the controller controls the tactile force sense presented to the movable portion by performing control of the actuator by controlling a voltage or a current supplied to the actuator on a basis of the received control voltage value or the received control current value.

5. The information processing system of claim 4, wherein
the receiving circuit further receives information related to a duration of control together with the information identifying the second control mode, and
the controller performs control of the actuator for only the received duration.

6. The information processing system of claim 4, further comprising:
a storing medium for storing setting information including at least one set of information identifying a positional range of the actuator or the movable portion and control information, wherein
when the receiving circuit receives, as the instruction related to the control of the tactile force sense, information identifying a third control mode and information identifying one piece of setting information in the setting information stored by the storing medium,
the controller reads, from the storing medium, the set of the information identifying the positional range of the actuator or the movable portion and the control information, the set being included in the identified setting information, and controls the tactile force sense presented to the movable portion by performing control of the actuator on a basis of the control information corresponding to the positional range of the actuator or the movable portion, the positional range including a position of the actuator or the movable portion.

7. A control method for an operation device, the operation device having a movable portion movable between a first position and a second position via direct contact pressure by a user while the operation device is gripped by the user, the control method comprising:
receiving information identifying a control mode, among a plurality of control modes, and control information determined for such control mode as an instruction related to control of a tactile force sense, and
controlling the tactile force sense presented to the movable portion by using the received control information in the control mode identified by the received information, wherein:
the receiving includes receiving setting information taken from one or more pre-stored profiles,
the control mode establishes which of the one or more pre-stored profiles is selected for use by the controller, and
the controlling includes controlling the tactile force sense presented to the movable portion in response to the selected one of the pre-stored profiles,
the movable portion includes an actuator, where the actuator is not movable via the direct contact pressure by the user,
when the receiving includes receiving, as the instruction related to the control of the tactile force sense, information including information identifying a first control mode, a target position as control information determined in advance for the first control mode, and a control gain of the actuator, and
the controlling includes controlling the tactile force sense presented to the movable portion by performing control of the actuator on a basis of a difference between a position of the actuator and the target position and the information of the control gain.

* * * * *